United States Patent
Nikuie et al.

(10) Patent No.: US 6,510,160 B1
(45) Date of Patent: Jan. 21, 2003

(54) ACCURATE COMPUTATION OF PERCENT UTILIZATION OF A SHARED RESOURCE AND FINE RESOLUTION SCALING OF THE THRESHOLD BASED ON THE UTILIZATION

(75) Inventors: Mohammed Nikuie, Mountain View, CA (US); Christopher D. Bergen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/245,120

(22) Filed: Feb. 4, 1999

(51) Int. Cl.[7] .......................... H04L 12/56; G06F 11/00
(52) U.S. Cl. ..................... 370/412; 370/232; 370/395.7
(58) Field of Search ................................. 370/412, 230, 370/232, 235, 419, 415, 395.7, 229

(56) References Cited

U.S. PATENT DOCUMENTS

| | | | | |
|---|---|---|---|---|
| 5,745,490 A | * | 4/1998 | Ghufran et al. | 370/397 |
| 5,956,322 A | * | 9/1999 | Charny | 370/232 |
| 5,978,357 A | * | 11/1999 | Charny | 370/231 |
| 5,995,486 A | * | 11/1999 | Iliadis | 370/229 |
| 6,081,505 A | * | 6/2000 | Kilkki | 370/230 |
| 6,097,698 A | * | 8/2000 | Yang et al. | 370/231 |
| 6,167,030 A | * | 10/2000 | Kilkki et al. | 370/236 |
| 6,219,728 B1 | * | 4/2001 | Yin | 710/52 |
| 6,259,698 B1 | * | 7/2001 | Shin et al. | 370/395.7 |

OTHER PUBLICATIONS

The ATM Forum, Technical Committee, Utopia Level 2, Version 1.0, af-phy-0039.000, Jun. 1995, pp. 1–66.

* cited by examiner

Primary Examiner—Hassan Kizou
Assistant Examiner—Saba Tsegaye
(74) Attorney, Agent, or Firm—Blakely, Sokoloff, Taylor & Zafman LLP

(57) ABSTRACT

A method and apparatus for determining a percent utilization of shared resource and fine resolution scaling of a threshold based on the utilization is described. In one embodiment, the method includes detecting a cell that belongs to a VC queue where the VC queue includes a cell count, a minimum threshold cell count, and a maximum threshold cell count. The cell count is compared with the minimum threshold cell count. If the cell count is greater than (or equal to) the minimum threshold cell count, the method further includes determining a ratio between the cell count and the maximum threshold cell count, selecting a scaling factor responsive to the ratio, scaling the cell count by the scaling factor to provide a scaled cell count, comparing the scaled cell count with a maximum threshold cell count, and discarding the cell if the scaled cell count is greater than the maximum threshold cell count.

31 Claims, 8 Drawing Sheets

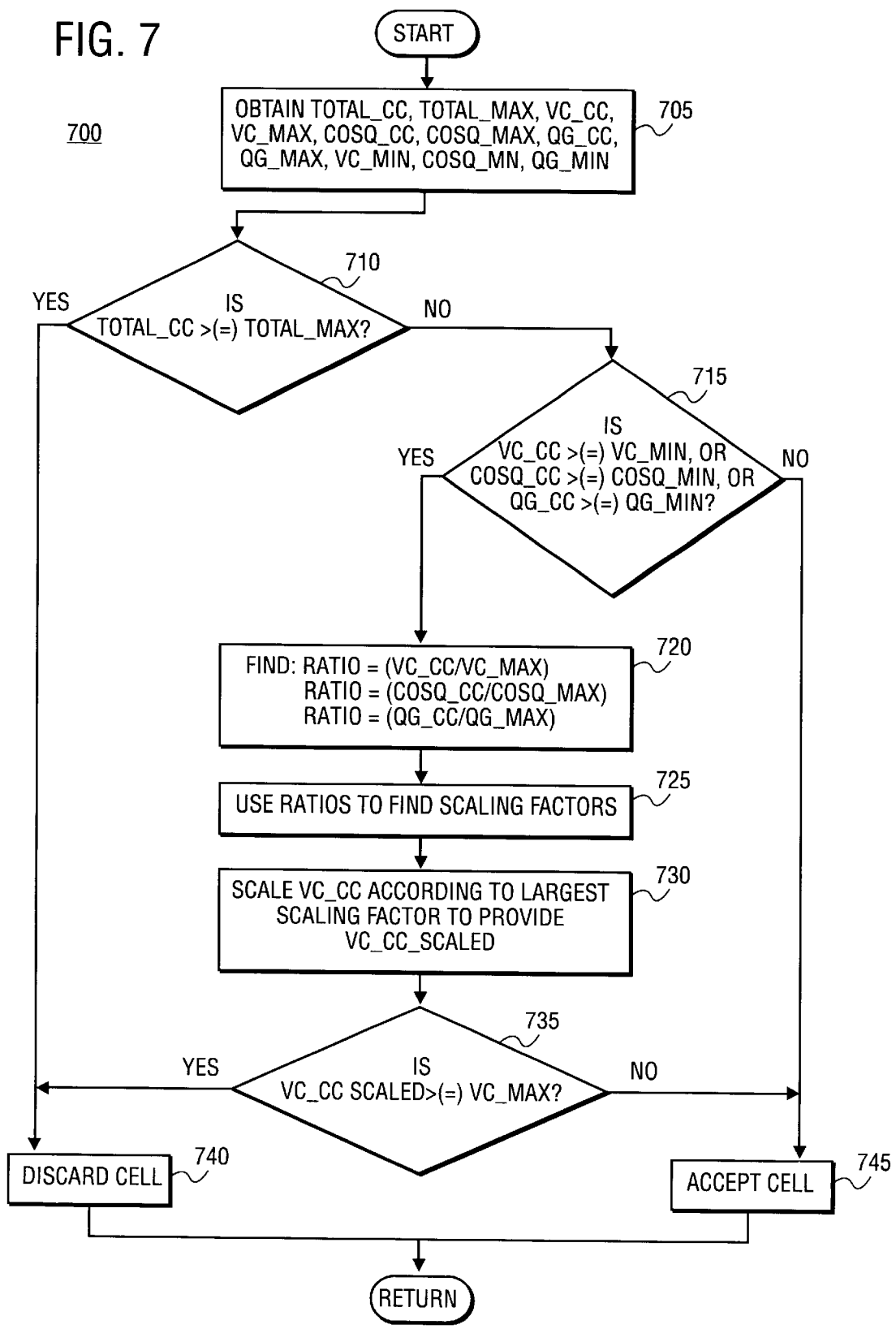

ACCURATE COMPUTATION OF PERCENT UTILIZATION OF A SHARED RESOURCE AND FINE RESOLUTION SCALING OF THE THRESHOLD BASED ON THE UTILIZATION

FIELD OF THE INVENTION

The present invention relates generally to communication systems, and specifically, to a method and apparatus for efficiently providing buffer resources within a communication device.

BACKGROUND INFORMATION

Asynchronous Transfer Mode ("ATM") networks are cell switching networks that transfer fixed length data units called "cells". Cells are transmitted from a source node to a destination node through ATM switches or digital switches, which are coupled together by way of communication lines. The ATM switches each includes a plurality of input ports coupled to input communication lines and a plurality of output ports coupled to outgoing communication lines.

Cells typically carry voice, video, and data from the source node to the destination node, and are fifty-three bytes in length including five bytes of header information and forty-eight bytes of payload. The header information includes a virtual path identifier ("VPI") field and a virtual channel identifier ("VCI") field. The VPI and VCI fields identify the next destination of a cell as it passes through a series of ATM switches on its way to its destination.

Each communication line can carry several different connections simultaneously. Queues or buffers are typically used for temporarily holding cells prior to transmission on a communication line. Additionally, more than one queue may be used to service different types of class of service connections. For example, cells belonging to higher priority connections (e.g., voice connections) are stored in queues that are marked as higher priority. On the other hand, cells belonging to lower priority connections (e.g., data) are stored in queues that are marked as lower priority.

Each ATM switch must be able to store or buffer cells for each connection. Consequently, in any ATM switch architecture, it is essential to efficiently use buffer resources, while remaining fair to all connections. Moreover, since the queues are finite in length, threshold values are set for each queue defining the maximum number of cells that can be stored for each connection. Thus, one function of an ATM switch is to determine whether to accept or reject cells depending on whether the queue that the cell belongs has reached its threshold.

One mechanism for providing efficient buffer resources is to over-allocate buffer space and scale the threshold values, i.e., cutting thresholds in one-half, one-fourth, etc. However, this does not provide sufficient granularity to maintain fairness on all connections, and imposes sudden severe punishment on misbehaving connections.

SUMMARY OF THE INVENTION

A method for performing threshold checking in a communication device is described. A cell that belongs to a first queue is detected, where the first queue includes a cell count and a maximum threshold cell count. A ratio is determined between the cell count and the maximum threshold cell count to select a scaling factor, responsive thereto. The method includes scaling the cell count by the scaling factor to provide a scaled cell count and comparing the scaled cell count with a maximum threshold cell count. The cell is discarded if the scaled cell count is greater than the maximum threshold cell count.

Other objects, features, and advantages of the present invention will be apparent from the accompanying drawings and from the detailed description that follows below.

BRIEF DESCRIPTION OF THE DRAWINGS

The present invention is illustrated by way of example and not limited in the figures of the accompanying drawings in which like references indicated similar elements and in which:

FIG. 7 is a flow diagram showing a process for scaling a threshold based on a percent utilization of a shared resource.

DETAILED DESCRIPTION

A method and corresponding apparatus is described for performing threshold checking in a communication device. A cell that belongs to a first queue is detected, where the first queue includes a cell count and a maximum threshold cell count. A ratio is determined between the cell count and the maximum threshold cell count to select a scaling factor, responsive thereto. The method includes scaling the cell count by the scaling factor to provide a scaled cell count and comparing the scaled cell count with a maximum threshold cell count. The cell is discarded if the scaled cell count is greater than the maximum threshold cell count.

Intended advantages of one or more embodiments include accurate and fast computation of resource utilization, fine resolution scaling of thresholds based on the resource utilization, efficient use of memory resources by over-allocating buffer space, and higher overall resource availability by forcing connection that use a higher percentage of their allocated resources to be the first to have their arriving cells dropped.

Figure 1:
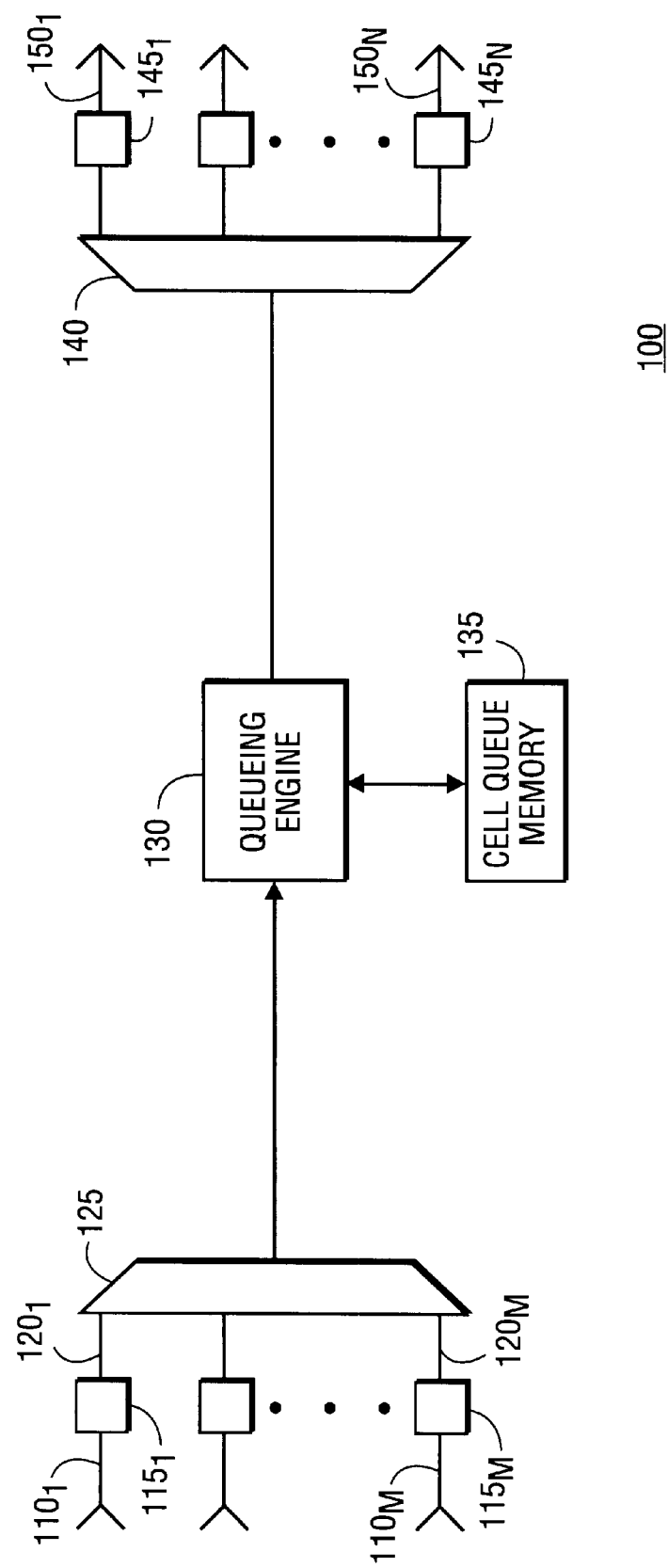
FIG. 1 is a block diagram of a communication switch.

FIG. 1 is a block diagram of a communication switch 100. In one embodiment, the communication switch 100 is an asynchronous transfer mode ("ATM") switch. Alternative embodiments may be implemented in other types of communication devices such as, for example, gateways, routers, and the like. Referring to FIG. 1, the ATM switch 100 includes a plurality of input communication lines $110_1$–$100_M$ (or ports) coupled to corresponding physical interfaces $115_1$–$115_M$, where M is a positive whole number. The physical interfaces $115_1$–$115_M$ convert signals from one interface to another, and provide data units on signal lines $120_1$–$120_M$. In one embodiment, the data units comprise fixed length ATM cells, although the communication switch 100 may support other types of data units such as, for example, data packets (e.g., in the case of a router). The cells are fifty-three bytes in length that includes five bytes of header information and forty-eight bytes of payload.

The signal lines $120_1$–$120_M$ are coupled to inputs of an ingress multiplexer ("mux") 125 which transfers cells from the signal lines $120_1$–$120_M$ to a queuing engine 130 in a time-multiplexed manner. For one embodiment, the ingress mux 125 allocates 1/Mth of a fraction of time to each input line. The queuing engine 130 performs, among other things, three major functions for each cell that is received, namely, (i) determining the destination of the cells (i.e., cell routing); (ii) determining whether to accept or reject the cells depending on the amount of congestion; and (iii) providing bandwidth management, i.e., transmitting cells from different queues according to the queues respective priorities and allocated bandwidth.

The queuing engine 130 is coupled to a cell queue memory 135, which may include one or more synchronous dynamic random access memory ("SDRAM") devices. The queuing engine 130 stores cells to and retrieves cells from the memory 135. The organization of the cell queue memory 135 will be described in more detail below.

The output of the queuing engine 130 is coupled to a demultiplexer 140. The demultiplexer 140 is coupled to output communication lines $150_1$–$150_N$ (or ports) through physical interfaces $145_1$–$145_N$, where N is a positive whole number. The queuing engine 130 determines the output port that the cells are to be transmitted to and commands the demultiplexer 140 to direct the cells to the appropriate output port. The input and output communication lines $110_1$–$110_M$ and $150_1$–$150_N$ may include, but is not limited or restricted to, optical fibers, twisted pairs of wires, coaxial cables, and switches and support one or more of the following standards including, but not limited or restricted to, T1, T3, OC3, OC12, and OC48.

Figure 2:
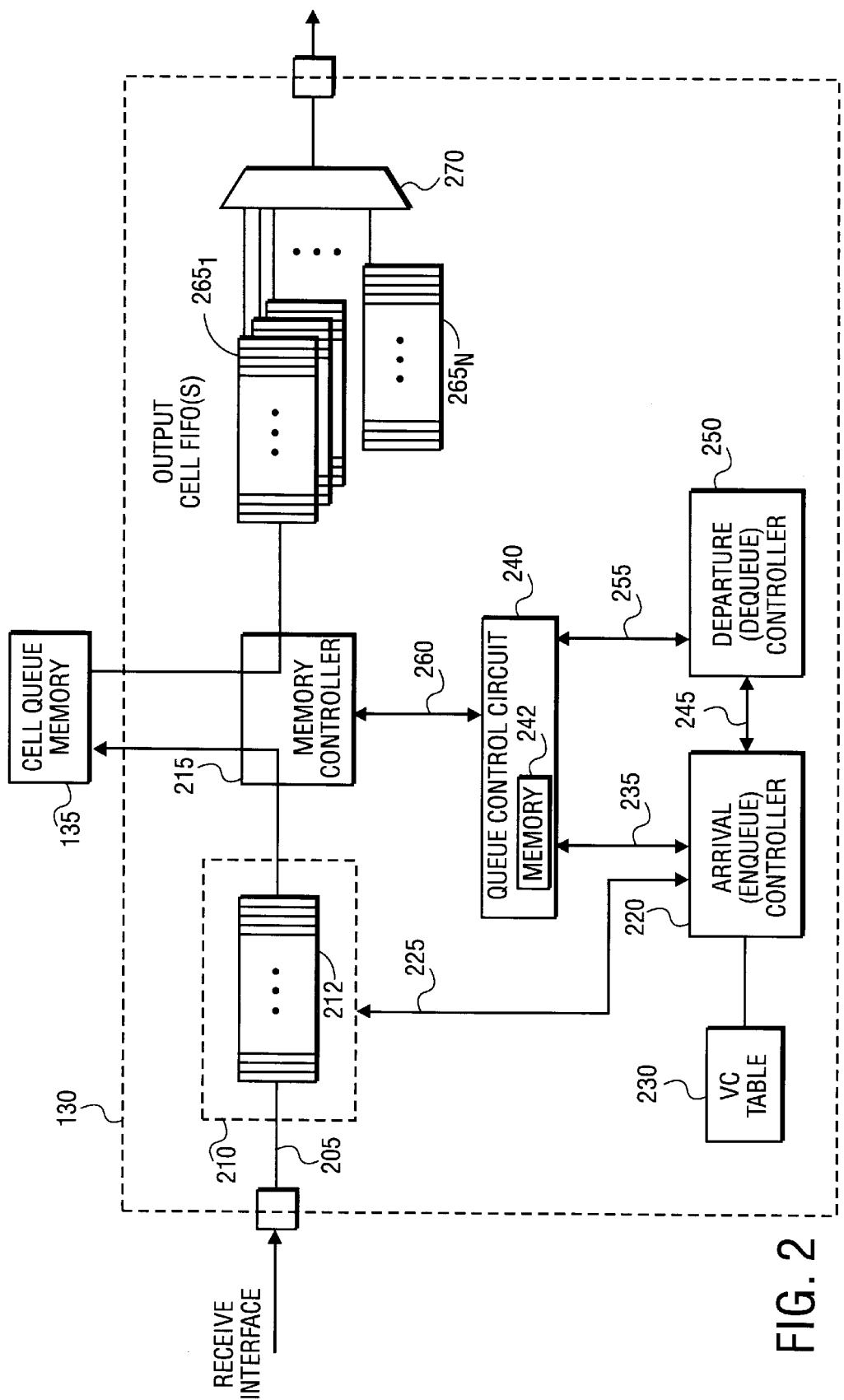
FIG. 2 illustrates a block diagram of a queuing engine.

FIG. 2 illustrates a block diagram of a queuing engine 130. Referring to FIG. 2, the queuing engine 130 includes an input engine 210 having a cell first-in first-out ("FIFO") 212 for temporarily storing cells received over parallel interface 205. In one embodiment, the parallel interface 205 is a Universal Test and Operations Physical Interface for ATM ("UTOPIA") interface, entitled UTOPIA, Level 2, Version 1.0, published in June 1995 by the ATM Forum. The depth of the input cell FIFO 210 may vary to meet the arrival rate of the cells received over the UTOPIA interface, though is generally small (e.g., 16 cells deep).

The input engine 210 transmits the header information of each arriving cell to an arrival controller 220 by way of signal lines 225. In particular, the arrival controller 220 reads the virtual channel identifier ("VCI") and virtual path identifier ("VPI") information in the header of each cell, performs a table lookup in a mapping table (hereinafter referred to as "VC table") 230, and transmits the new VPI/VCI information to the input engine 210 for modifying the header information. The arrival controller 220 also determines the output port that the cell is to be transmitted to, and determines whether to accept or reject the cells, as will be described in more detail below. The VC table 230 is typically contained within a volatile memory device, though is not required to be. The VC table 230 includes configuration information for each virtual connection ("VC") that is established, and is updated as connections are created and destroyed. The configuration information is described in more detail with respect to FIG. 4.

Once the arrival controller 220 transmits the new VPI/VCI information to the input engine 210 by way of signal lines 225, the input engine 210 modifies the header of the cell to the new values. The input engine 210 then transmits the cell to the memory controller 215. The memory controller 215 stores the cell in a queue within the cell queue memory 135 and transmits a pointer to the cell to a queue control circuit 240. The queue control circuit 240 includes a memory 242 (e.g., a combination of random access memory "RAM" and read only memory "ROM") for storing various values such as pointers, threshold values, queue cell counts, and the like. The queue control circuit 240 keeps track of the cells in queues within the cell queue memory 135 by way of a linked list, which may be contained in part of the memory 242. The linked list is updated to link the cell only if instructed to do so by the arrival controller 220. The arrival controller 220 performs threshold checking to determine whether to accept or reject cells. The criteria(ion) for accepting or rejecting cells will be described in more detail in the following paragraphs. If the arrival controller 220 accepts the cell, the queue control circuit 240 is directed to link the cell to the linked list maintained in the memory 242. On the other hand, if the cell is rejected, the arrival controller 220 does nothing or instructs the queue control circuit 240 not to link the cell to the end of a queue.

Figure 3:
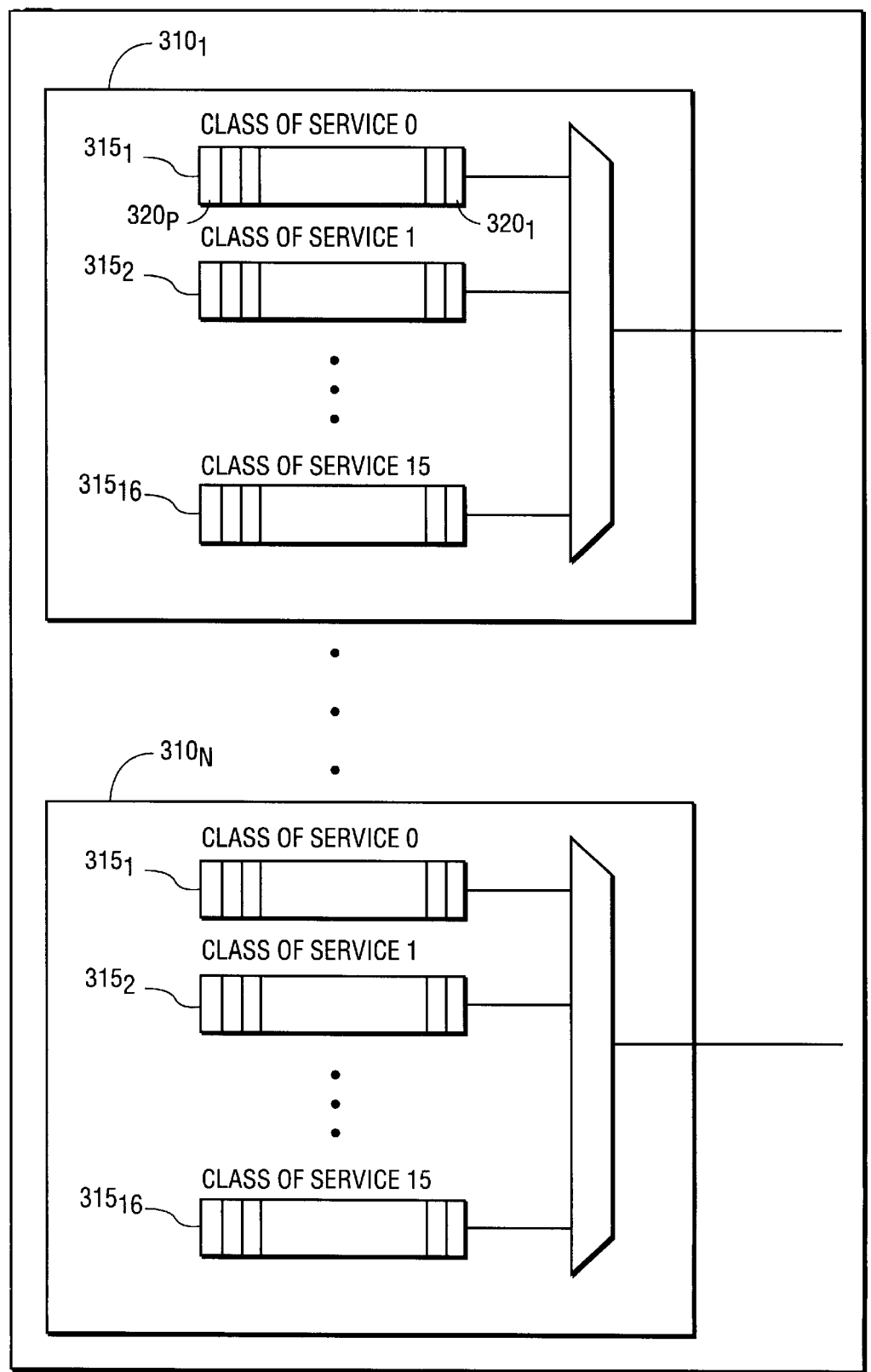
FIG. 3 shows an organization of the cell queue memory.

FIG. 3 shows an organization of the cell queue memory 135. Referring to FIG. 3, the cell queue memory 135 is broken up into a plurality of queue groups $310_1$–$310_N$ ("310") which are associated with the number of output ports (or virtual interface) supported. Each queue group 310 is further broken up into one or more class of service queues. For example, queue group 310, includes, for example, sixteen class of service queues $315_1$–$315_{16}$ ("315"). The number of class of service queues is a matter of design choice and may vary from one implementation to another.

The class of service queues 315 typically represent priority levels depending on the cell type. For example, cells belonging to higher priority connections (e.g., voice cells) are stored in class of service queues that have a higher priority of service, while cells belonging to lower priority connections (e.g., data cells) are stored in class of service queues that have a lower priority of service. Each VC is assigned to a particular class of service queue depending on its traffic type (e.g., voice, data, etc.). Consequently, each class of service queue 315 includes one or more VC queues $320_1$–$320_P$ ("320"), where "P" is a positive whole number, since more than one VC may be assigned to a class of service queue. Incoming cells are stored at the end of the VC queue that corresponds to the cell's VC, while outgoing cells are retrieved from the head of the VC queue.

A common memory pool is shared by all the class of service queues in the queue groups $301_1$–$310_N$. As described above, the class of service queues are maintained by forming linked lists of buffers from the common memory pool. When a VC is configured to buffer cells to a VC queue 320 within a class of service queue 315, a linked list of the cells is maintained.

Continuing to refer to FIG. 3, a queue group cell count ("qg_cc") and a programmable maximum threshold cell count ("qg_max") are maintained for each queue group 310, a class of service cell count ("cosq_cc") and a programmable maximum threshold cell count ("cosq_max") are maintained for each class of service queue 315, and a VC cell count ("vc_cc") and a programmable VC maximum threshold cell count ("vc_max") are maintained for each VC queue 320. In addition, a total global cell count ("total_cc") and a programmable total global maximum threshold cell count ("total_max") are maintained for the entire cell queue memory 135. The cell count for each level is updated for each incoming cell that is accepted. The maximum threshold cell counts are programmable fixed values and may vary from one group to another, from one class of service queue to another, and from one VC to another. The cell counts and maximum threshold cell counts are typically contained in the memory 242 of the queue control circuit 240 (FIG. 2), though vc__cc and vc__max may be stored in the VC table 230.

Referring back to FIG. 2, if a cell is accepted (i.e., the queue group 310, class of service queue 315, and/or VC queue 320 have room for the cell), the cell is stored in the class of service queue that belongs to the cell's VC. The arrival controller 220 is coupled to the queue control circuit 240 which stores statistics about the class of service queues maintained within the cell queue memory 135. These statistics includes cell counts for each queue group 310 and class of service queue 315, threshold values, etc.

The departure controller 250 controls the rate at which cells depart from the queuing engine 130 depending on the configuration of the queues and the amount of cells in the queues. For each cell that is received and accepted, the arrival controller 220 indicates to the departure controller 250 by way of signal line(s) 245 that a cell has been received. Consequently, the departure controller 250 keeps track of the cell counts in the queues. The departure controller 250 is also coupled to the queue control circuit 240 for determining the queues that contain cells. Based on the queue cell counts, and priority information of the queues, the departure controller 250 then determines which queue to service. The departure controller 250 directs the queue control circuit 240 by way of signal line(s) 255 to retrieve cells from the cell queue memory 220 and place them in one of the output FIFOs $265_1$–$265_N$. The number of FIFOs corresponds to the number of output ports. The output FIFOs $265_1$–$265_N$ are coupled to an output mux 270 for transmitting cells to the demultiplexer 140 (FIG. 1).

Figure 4:
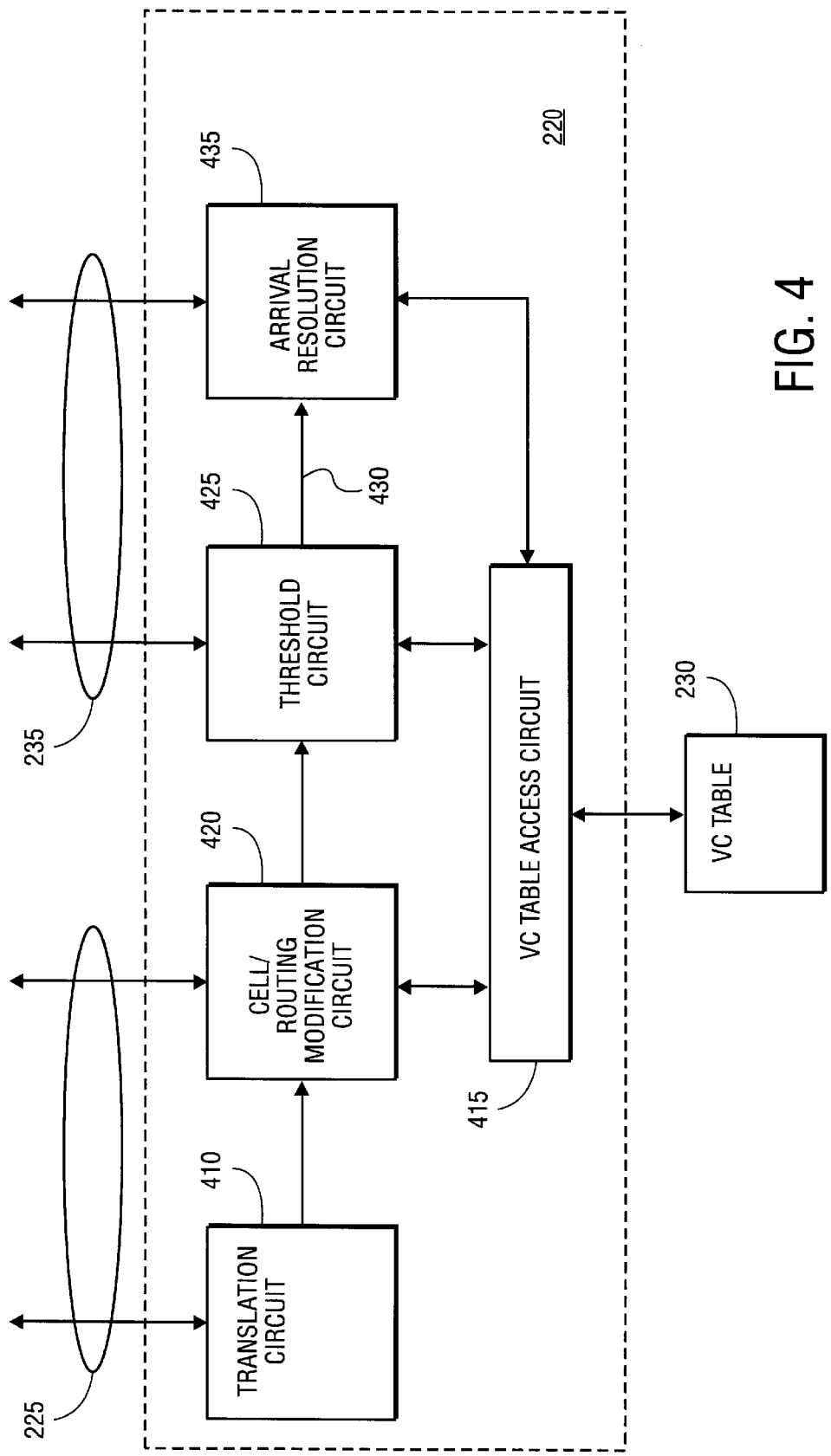
FIG. 4 is a block diagram of the arrival controller of FIG. 2.

FIG. 4 is a block diagram of the arrival controller 220 of FIG. 2. The arrival controller 220 performs cell processing (e.g., in a pipelined fashion). More specifically, the arrival controller 220 determines, among other things, (i) whether to accept or discard cells (ii), the new VPI/VCI values of cells, and (iii) the connection to which cells belong and links cells to the appropriate VC and class of service queues.

Referring to FIG. 4, the arrival controller 220 includes a translation circuit 410 which receives the header of each cell by way of signal lines 225 and translates the VPI/VCI information into a connection identification number. The translation circuit 410 then transmits the connection identification number to a cell routing/modification circuit 420. The cell routing/modification circuit 420 uses the connection identification number as a pointer in the VC table 230 through a VC table access circuit 415. The VC table 230 then provides various values regarding the VC to the cell routing/ modification circuit 420. The values include, among other things, the new VPI/VCI for the cell, the VC cell count, the class of service queue within a queue group that the cell belongs to, etc.

The cell routing/modification circuit 420 receives the new VPI/VCI values that correspond to the connection identification number and transmits the values to the input engine 210 (FIG. 2) by way of signal lines 225. The input engine 210 modifies the header of the cell to the new VPI/VCI values, and transmits the cell to the memory controller 215 for storing the cell in the cell queue memory 135. The cell routing cell routing/modification circuit 420 then determines which class of service queue to link the cell to. This information is retrieved from the VC table 230 and is forwarded to an arrival resolution circuit 435. However, before linking the cell, the arrival controller 220 must first determine whether to accept or reject the cell.

The cell routing/modification circuit 420 is coupled to a threshold circuit 425, which performs the cell acceptance/ rejection function (i.e., threshold checking). The threshold circuit 425 is coupled to the queue control circuit 240 by way of signal lines 235 for retrieving various threshold values, cell counts, queue depths, etc. for performing threshold checking. The threshold circuit 425 is also coupled to an arrival resolution circuit 435 by way of signal line 430 for providing a DISCARD signal to the arrival resolution circuit 435. If DISCARD is a zero, indicating acceptance of the cell, the arrival resolution circuit 435 instructs the queue control circuit 240 to link the cell to the VC and class of service queues that the cell belongs to. In addition, in the case of cell acceptance, the arrival resolution circuit 435 instructs the queue control circuit 240 to update (e.g., increment) the total cell count (total__cc), and the queue group cell count (qg__cc), the class of service cell count (cosb__cc), and the VC cell count (vc__cc) that the cell belongs to. These values are typically located in memory 242 of the queue control circuit 240 (FIG. 2), though vc__cc may be located in the VC table 230 in which case the arrival resolution circuit 435 updates this value. If DISCARD is a one, indicating a discard, the arrival resolution circuit 435 does not cause the queue control circuit to link the cell to the class of service or VC queues.

Threshold checking involves evaluating the total cell (total__cc), and the VC queue (vc__cc), class of service queue (cosq-cc), and queue group (qg__cc) cell counts that the incoming cell belongs to. In its simplest form, if any of the cell counts are greater than (or equal to) corresponding maximum threshold cell counts, the cell is discarded, otherwise the cell is accepted.

However, to provide efficient use of the memory resources, buffer space is over-allocated in the cell queue memory 135 (FIG. 2). Consequently, to prevent the cell queue memory 135 from filling up, the maximum thresholds for the VC queues, class of service queues, and/or queue groups are dynamically scaled. For example, when the number of cells in the cell queue memory 135 that belong to a class of service queue begins to approach the maximum threshold for that class of service, the maximum threshold of each VC belonging to that class of service queue are reduced (scaled back) by a scaling factor (e.g., a common scaling factor). The closer the shared resource utilization is to its maximum threshold, the more the connection thresholds are scaled down. Thus, VCs using a higher percentage of their allocated resources will be the first to have their arriving cells dropped. This preserves the Selective Cell Discard and Frame Discard features under congestion, while resulting in higher overall resource availability.

To perform threshold scaling, the ratio of the resource usage with respect to a maximum threshold is first determined. The maximum threshold is then gradually scaled back in proportion to the percentage of the resource utilization. In one embodiment, threshold scaling is performed in two steps. The first step involves accurately and efficiently computing the ratio of the resource usage in hardware and providing a scaling factor ("SF"), responsive thereto. The second step involves using the SF to scale back the maximum threshold with fine resolution.

Figures 5A, 5B:
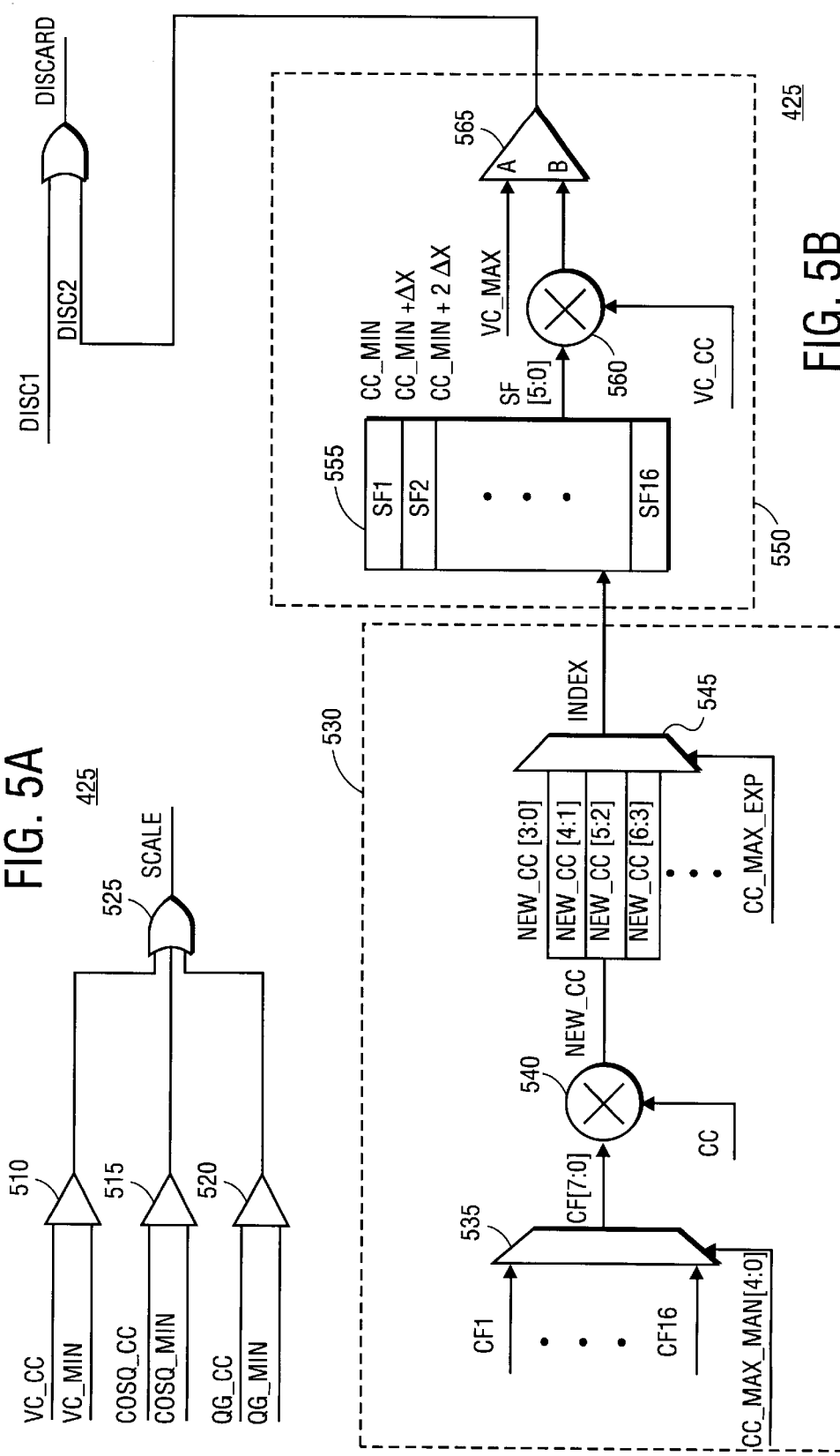
FIG. 5A is a portion of the threshold circuit of FIG. 4.
FIG. 5B is a block diagram of another portion of the threshold circuit of FIG. 4.

Referring now to FIG. 5A, a portion of the threshold circuit 425 of FIG. 4 may be seen. As shown therein, the total cell count (total__cc) is compared with the total maximum threshold cell count (total__max) by comparator 505. If total__cc is greater than (or equal to) total__max, the output (DISC1) of comparator 505 is a logic "one", indicating a discard condition. With DISC1 being a logic "one", the output of "OR" gate 570 and the threshold circuit 425 (DISCARD) is high. No other threshold checking is required and the task of the threshold circuit 425 is complete.

However, if total_cc is less than total_max, further threshold checking is required. In this latter case, the VC cell count (vc_cc) is compared with a minimum VC threshold cell count (vc_min) using comparator 510 to determine whether to perform threshold scaling. The vc_min may be set at any value and may vary from one VC queue to another. In one embodiment, vc_min is set at one-half of vc_max. If vc_cc is greater than (or equal to) vc_min, the output of comparator 510 and "OR" gate 525 is a logic "one", indicating that threshold scaling is to be performed. Similarly, the class of service queue cell count (cosq_cc) may optionally be compared with a class of service minimum threshold cell count (cosq_min) using comparator 515, and the queue group cell count (qg_cc) may optionally be compared with a minimum queue group threshold cell count (qg_min) using comparator 520. If any of the outputs of comparators 510, 515, or 520 is a logic "one", then the output (SCALE) of "OR" gate 525 is a logic "one" to enable threshold scaling. Therefore, any one or more of the VC cell count, class of service queue cell count, or queue group cell count may enable threshold scaling. If threshold scaling is not enabled (i.e., SCALE=0), then, by definition, the cell counts are less than the corresponding maximum threshold cell counts. Consequently, the cell is accepted and the task of the threshold circuit 425 is complete. Note that other threshold checking, in addition to the threshold checking described in the embodiment described herein, may exist independently (e.g., dropping or rejecting an entire frame if the cell count is too high). However, such other threshold checking is not important to the teachings of the embodiments described herein.

FIG. 5B is a block diagram of another portion of the threshold circuit 425 of FIG. 4. This portion of the threshold circuit 425 performs the threshold scaling function and is enabled only if SCALE=1. Referring to FIG. 5B, the threshold circuit 425 includes a first block 530 and a second block 550. The first block 530 determines the ratio of the cell count to a corresponding maximum threshold cell count (e.g., qg_cc/qg_max, cosq_cc/cosq_max, and/or vc_cc/vc_max) to provide an index. The second block 550 determines a scaling factor, responsive to the index, to scale up the VC cell count (vc_cc) to a new scaled cell count, and compares the new scaled cell count with the VC maximum threshold cell count.

The inputs to the first block 530 include conversion factor values $CF_1$–$CF_x$ (where "X" is a positive whole number), a selected cc (e.g., vc_cc, cosq_cc, and/or qg_cc), and a selected cc_max (e.g., vc_max, cosq_max, and/or qg_max). Thus, one or more of the vc_cc and vc_max cell counts, cosq_cc and cosq_max cell counts, and qg_cc and qg_max cell counts may be used to determine the index value. In the case where more than one level of values are used, more than one copy of block 530 is provided to calculate corresponding index values (in parallel). The highest index value is then chosen as the input to the second block 550. For sake of illustration, cc and cc_max are vc_cc and vc_max respectively.

In one embodiment, cc_max is represented in the mmmmm2^eeee floating-point format with "m" bits of mantissa and "e" bits of exponent, and the value is assumed to be normalized (i.e., the most significant bit "MSB" of the mantissa is a one unless the exponent is zero). The conversion factor values are retrieved from the memory 242 of the queue control circuit 240 and may vary from one qc_max, cosq_max, or vc_max to another. The conversion factor values $CF_1$–$CF_x$ represent coded values that, when multiplied by cc_max, will result in cc_max being the next higher whole power of two number. That is, ratio=cc/cc_max ratio=(cc/cc_max)*(CF/CF)

ratio=(cc*CF)/(cc_max*CF), (1)

where the denominator (cc_max*CF) of equation (1) is equal to the next higher whole power of two number. In one embodiment, $X=2^{m-1}$. For sake of clarity and illustration, $X=2^{m-1}$ and the mantissa "m" of cc_max is chosen to be five bits, though it may be any number of bits in length. With five mantissa bits, there are a total of sixteen ($X=2^4$) conversion factor values $CF_1$–$CF_{16}$, which are coupled to inputs of mux 535. The four least significant bits ("LSBs") of the cc_max mantissa are coupled to the control terminal of mux 535. The output of mux 535 is a selected conversion factor value CF[7:0]. The selected conversion factor value CF[7:0] and cc are coupled to a first multiplier 540. The selected conversion factor value CF[7:0] is a coded value which controls multiplier 540 to generate a new cell count (new_cc) that is equal to the numerator (CF* cc) of equation (1).

Figure 6A:
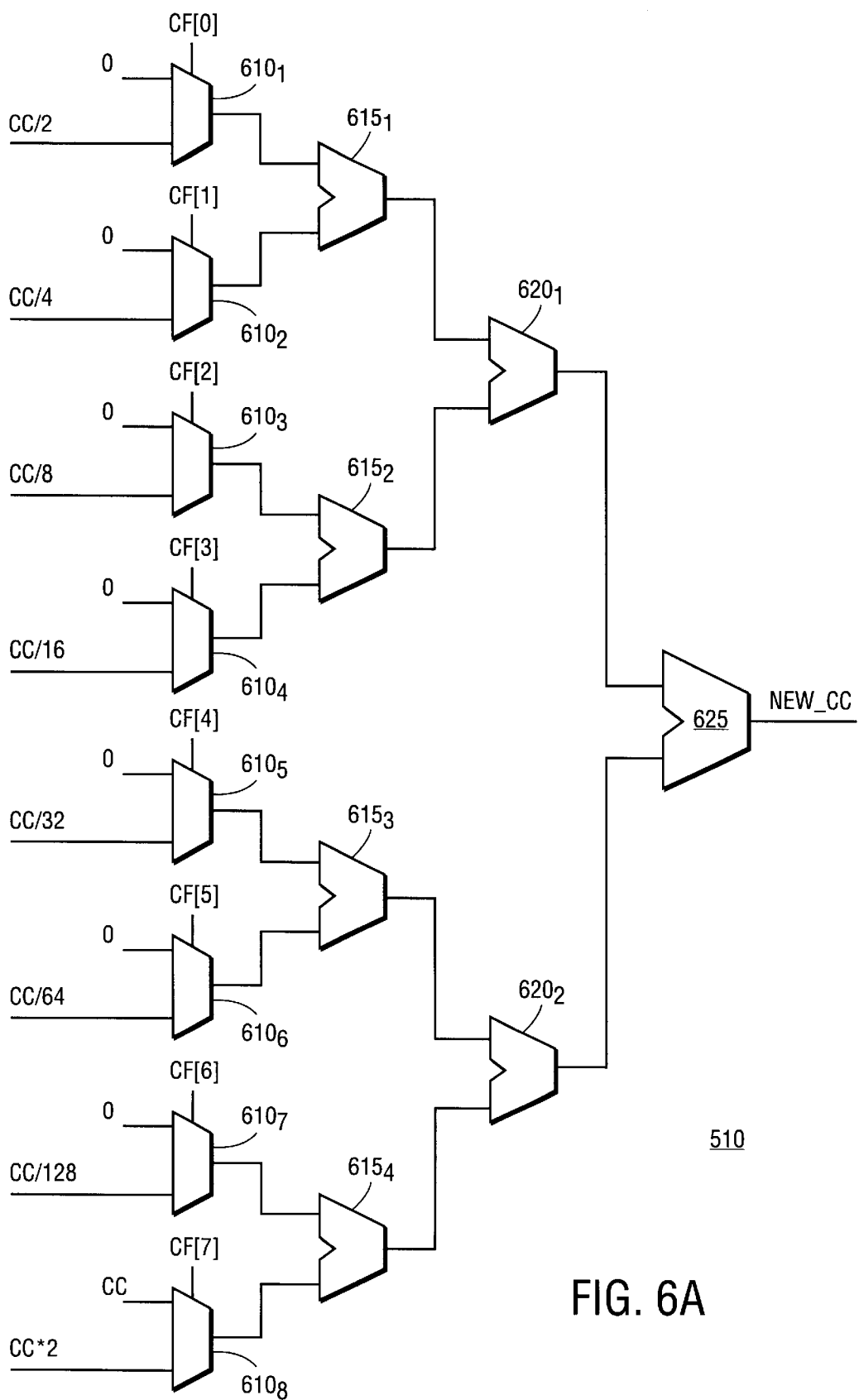
FIG. 6A shows a block diagram of the first multiplier of FIG. 5.

FIG. 6A shows a block diagram of the first multiplier 540 of FIG. 5 using three stages of adders. Referring to FIG. 6, the individual bits of the conversion factor value CF[7:0] are coupled to a control terminal of respective muxs $610_1$–$610_8$. A first input of muxs $610_1$–$610_7$ are zero, while the second input of the respective muxs are cc/2, cc/4, cc/8, cc/16, cc/32, cc/64, and cc/128. The inputs to mux $610_8$ are cc and cc*2. The outputs of muxs $610_1$–$610_8$ are added together, using three stages of adders $615_1$–$615_4$, $620_1$–$620_2$, and 625, to provide the new_cc.

By way of illustration, assume that cc_max is 10101*2^0011. The mantissa of cc_max is 10101 or decimal twenty-one. The next whole power of two for the mantissa is 100000 or decimal thirty-two. Thus, the coded value CF[7:0] is selected such that the new_cc is cc*100000/10101 or cc*1.524. In this illustration, the coded CF[7:0] is 01100001.

Referring back to FIG. 5B, the output of multiplier 540 is new_cc. In one embodiment, new_cc is an integer having Y bits in length (where "Y" is a positive whole number). The different bit positions of new_cc are coupled to different inputs of mux 545. That is, new_cc[3:0], new_cc[4:1], new_cc[5:2], new_cc[6:3], new_cc[7:4], and so on are coupled to respective inputs of mux 545. Four bit positions are selected because the output of mux 545 (INDEX) is a four-bit value that selects one of sixteen possible entries in table 555. It is to be appreciated that the table 555 may include any number of entries depending on a number of factors including, but not limited or restricted to, the desired scaling resolution.

The exponent of cc_max (cc_max_exp) is coupled to a control terminal of mux 545. The ratio of new_cc to the new_cc_max is the upper four significant bits of new_cc. However, to select the upper four significant bits, the number of valid bit positions of new_cc must first be determined. In the illustrated example provided above, the mantissa of cc_max was 10101 while its exponent was 0011, equating to 10101000 binary (occupying eight bit positions). However, since scaling is only enabled when the cell count (cc) is greater than the minimum cell count (cc min), the most significant bit of new_cc is always a one and is ignored. Therefore, the upper four significant bits of new_cc are bits [6:3] or 0101. Thus, in the illustrated example, INDEX is 0101. If cc_max was, for example, 10001*2^0100, then new_cc[7:4] would be selected as the INDEX.

The output of mux 545 (INDEX) is coupled to table 555 of the second block 550. The table 555 may be contained in a volatile memory or non-volatile memory, and may be part of the threshold circuit 425 (FIG. 4). The number of entries in the table 555 corresponds to the number of conversion factor values. In the example provided, sixteen conversion factor values were provided, in which case NDEX is a four-bit value and table 555 includes sixteen scaling factor entries $SF_1$–$SF_{16}$. The entries may be loaded from memory 242 of the queue control circuit 240. Each entry in the table 555 indicates the amount that vc_cc is to be scaled up, or, alternatively, the amount that vc_max is to be scaled down. As mentioned above, scaling is only performed if cc is greater than cc_min. Thus, the minimum cell count for the first scaling factor entry SF1 is equal to cc_min. In one embodiment, the cell count boundary between the first and second scaling factor entries (SF1 and SF2) is cc_min+$\Delta$X, where $\Delta$X=((cc_max−cc_min)/(# of entries)). However, this is not a requirement.

The output of table 555 is a selected scaling factor SF. In one embodiment, SF is six bits (SF[5:0]) and is of the form "sssnnn". Moreover, in one embodiment, SF is a coded value which scales up vc_cc by a predetermined amount. This has the same effect as reducing vc_max by the desired percentage. The SF[5:0] and the vc_cc are provided to a second multiplier 560. The multiplier 560 scales up vc_cc to provide vc_cc_scaled for comparison with vc_max.

Figure 6B:
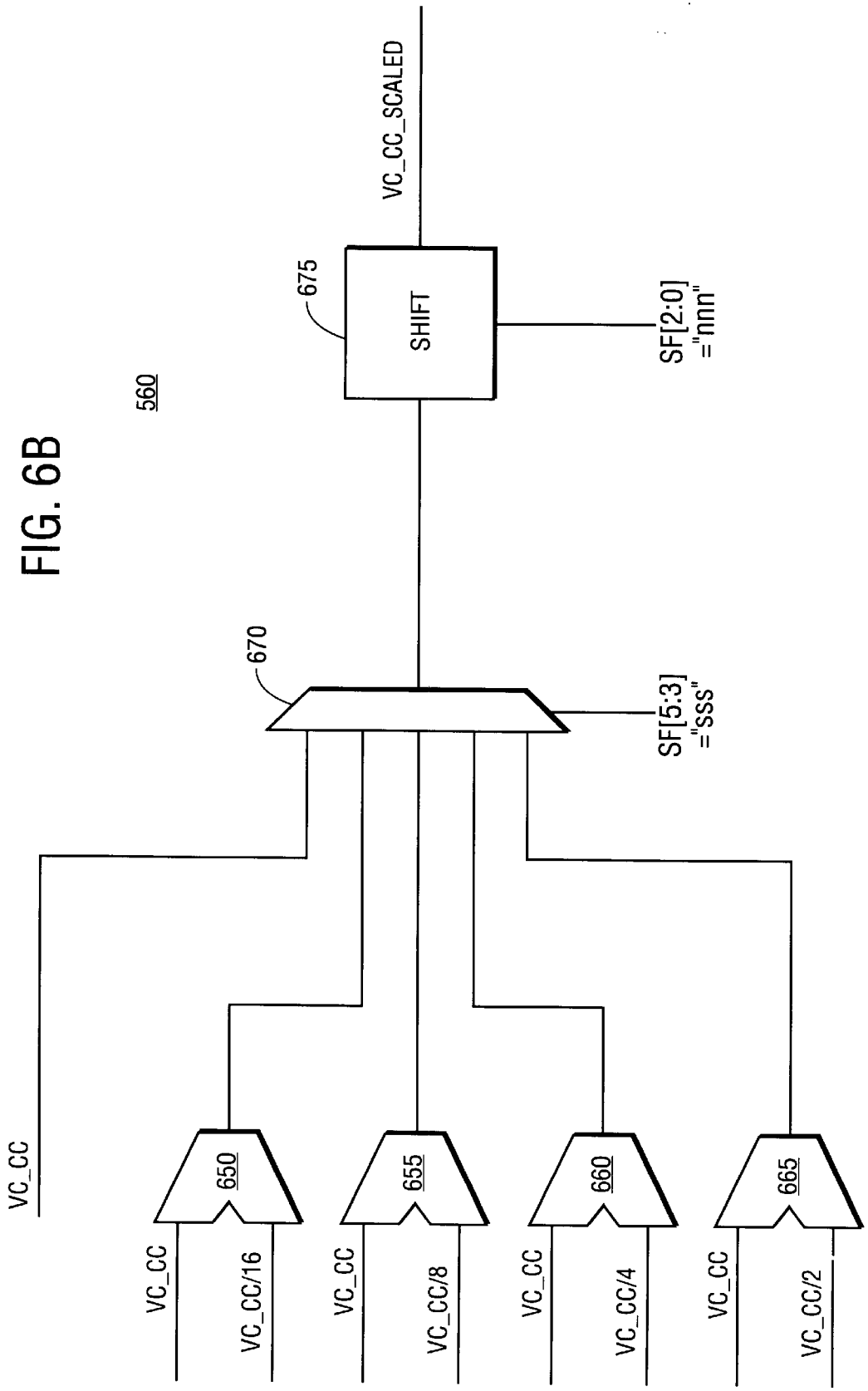
FIG. 6B shows a block diagram of the second multiplier of FIG. 5.

FIG. 6B shows a block diagram of the second multiplier 560 of FIG. 5. Table 1 illustrates an exemplary scaling factor table that corresponds to the exemplary embodiment of FIG. 6B.

TABLE 1

| S/n | 0 | 1 | 2 | 3 | 4 | 5 | 6 | 7 |
|---|---|---|---|---|---|---|---|---|
| 0 | 100% | 50% | 25% | 12% | 6% | 3% | 1.5% | .75% |
| 1 | 94% | 47% | 24% | 12% | 6% | 3% | 1.5% | .75% |
| 2 | 89% | 44% | 22% | 11% | 5% | 3% | 1.4% | .7% |
| 3 | 80% | 40% | 20% | 10% | 5% | 2.5% | 1.3% | .65% |
| 4 | 67% | 34% | 17% | 8% | 4% | 2% | 1% | .5% |

Referring to FIG. 6B, the "sss" field (SF[5:3]) is coupled to a control terminal of mux 670. The inputs to mux 670 are vc_cc, and the outputs of adders 650, 655, 660, and 665. Adder 650 adds vc_cc/16 to vc_cc, adder 655 adds vc_cc/8 to vc_cc, adder 660 adds vc_cc/4 to vc_cc, and adder 665 adds vc_cc/2 to vc_cc. These inputs to mux 670 correspond to column "0" of Table 1. For example, if "sss" equals 011, the output of adder 660 is provided to output of mux 670 causing vc_cc to be multiplied by 1.25 (or divided by 80%). The mux 670 is coupled to shifter 675, which shifts left the output of mux 670 by "nnn" (SF[2:0]) to provide vc_cc_scaled as output. Thus, for example, if "sss" is 011 and "nnn" is 001, then vc_cc is multiplied by 2.5 (or divided by 40%).

Referring back to FIG. 5B, the output of multiplier 560 is vc_cc_scaled and is coupled to one input of comparator 565. The other input of comparator 565 is vc_max. If vc_cc_scaled is greater than (or equal to) vc_max, the outputs of comparator 565 (DISC2) and "OR" gate 570 (DISCARD) are a logic "one", causing the cell to be discarded. However, if vc_cc_scaled is less than vc_max, the cell is not discarded.

FIG. 7 is a flow diagram showing a process 700 for scaling a threshold based on a percent utilization of a shared resource. Referring to FIG. 7, the process 700 commences at block 705 where cell counts, and minimum and maximum threshold values for each level are retrieved from the memory 242 of the queue control circuit 240 and optionally from the VC table 230. The process then moves to block 710 where the total cell count (total_cc) is compared with the total maximum threshold cell count (total_max). If total_cc is greater than (or equal to) total_max, the process jumps to block 740 where the cell is discarded (or rejected) and the process ends. On the other hand, if total_cc is less than total_max, the process continues to block 715. At block 715, the VC cell count (vc_cc) is compared with the VC minimum threshold cell count (vc_min), class of service queue cell count (cosq_cc) is compared with the class of service queue minimum threshold cell count (cosq_min), and the queue group cell count (qg_cc) is compared with the queue group minimum threshold cell count (qg_min). If all of the cell counts are less than the corresponding minimum threshold cell counts, the process jumps to block 745 where the cell is accepted, and the process ends.

At block 715, if any of the cell counts are greater than (or equal to) the corresponding minimum threshold cell counts, then the process moves to block 720. At block 720, for those cell counts that are greater than (or equal to) the corresponding minimum threshold cell counts, the ratios of the cell counts to the corresponding maximum threshold cell counts are determined. At block 725, the ratios are then used to determine the scaling factor values, which range between 0.0 and 1.0. At block 730, the lowest scaling factor value is then used to scale up vc_cc by dividing vc_cc by the scaling factor to provide a scaled VC cell count (vc_cc_scaled). This has the same effect as multiplying vc_max by the scaling factor. The process then moves to block 735 where vc_cc_scaled is compared with vc_max. If vc_cc_scaled is greater than (or equal to) VC max, the process moves to block 740 where the cell is discarded, otherwise the process moves to block 745 where the cell is accepted.

In one embodiment, the process 700 of FIG. 7 is implemented using a circuit, as illustrated by the exemplary threshold circuit 425 of FIGS. 5A and 5B. In another embodiment, the process 700 is implemented with software using a microcontroller, microprocessor, etc. That is, the calculations, comparisons, etc. of FIG. 7 are implemented in a software subroutine or an equivalent. This software subroutine is then placed in any memory device (e.g., memory 242 or other memory device) and the function of the threshold circuit 425 is performed by a microprocessor (e.g., replacing the threshold circuit with the microprocessor).

In the foregoing specification, the invention has been described with reference to specific exemplary embodiments thereof. It will, however, be evident that various modifications and changes may be made thereto without departing from the broader spirit and scope of the present invention as set forth in the appended claims. The specification and drawings are, accordingly, to be regarded in an illustrative rather than a restrictive sense.

What is claimed is:

1. A method for performing threshold checking in a communication device, comprising:
   detecting a cell that belongs to a first queue, where a cell count and a maximum threshold cell count are associated with the first queue;
   determining a ratio between the cell count and the maximum threshold cell count;
   selecting a scaling factor responsive to the ratio between the cell count and the maximum threshold cell count;

scaling the cell count by the scaling factor to provide a scaled cell count; comparing the scaled cell count with the maximum threshold cell count; and discarding the cell if the scaled cell count is greater than the maximum threshold cell count.

2. The method of claim 1 wherein the cell is a start of frame cell.

3. The method of claim 1 wherein the cell is a start of packet cell.

4. The method of claim 1 wherein discarding the cell comprises discarding the cell if the scaled cell count is greater than or equal to the maximum threshold cell count.

5. The method of claim 1 wherein a minimum threshold cell count is associated with the first queue, the method further comprising:

comparing the cell count with the minimum threshold cell count; and performing the determining, the selecting, the scaling, the comparing, and the discarding as a consequence of the cell count being greater than the minimum threshold cell count.

6. The method of claim 1, wherein the cell also belongs to a second queue and a third queue, where a second cell count and a second maximum threshold cell count are associated with the second queue, and where a third cell count and a third maximum threshold cell count are associated with the third queue, the method of claim 1 further comprising:

determining a second ratio between the second cell count and the second maximum threshold cell count; and determining a third ratio between the third cell count and the third maximum threshold cell count, wherein, the ratio is the highest ratio amongst the ratio, the second ratio and the third ratio, the selecting a scaling factor responsive to the ratio between the cell count and the maximum threshold cell count further comprising using the highest ratio amongst the ratio, the second ratio and the third ratio as a basis for the selecting of the scaling factor.

7. The method of claim 6 wherein one of the queues is a virtual circuit (VC) queue, another of the queues is a class of service (COS) queue and another of the queues is a queue group.

8. An apparatus comprising:

a memory device including one or more instructions; and a processor coupled to the memory device, the processor, responsive to the one or more instructions, capable of, detecting a cell that belongs to a first queue, where a cell count and a maximum threshold cell count are associated with the first queue, determining a ratio between the cell count and the maximum threshold cell count, selecting a scaling factor responsive to the ratio between the cell count and the maximum threshold cell count, scaling the cell by the scaling factor to provide a scaled cell count, comparing the scaled cell count with the maximum threshold cell count, and discarding the cell if the scaled cell count is greater than the maximum threshold cell count.

9. The apparatus of claim 8 wherein the processor is a microcontroller.

10. The apparatus of claim 8 wherein the processor is a microprocessor.

11. The apparatus of claim 8 wherein the cell is a start of frame cell.

12. The apparatus of claim 8 wherein the cell is a start of packet cell.

13. The apparatus of claim 8 wherein the processor is capable of discarding the cell if the scaled cell count is greater than or equal to the maximum threshold cell count.

14. The apparatus of claim 8 wherein a minimum threshold cell count is associated with the first queue, the processor capable of:

comparing the cell count with the minimum threshold cell count; and performing the determining, the selecting, the scaling, the comparing, and the discarding as a consequence of the cell count being greater than the minimum threshold cell count.

15. The apparatus of claim 8, wherein, the cell also belongs to a second queue and a third queue, where a second cell count and a second maximum threshold cell count are associated with the second queue, and where a third cell count and a third maximum threshold cell count are associated with the third queue, the processor being capable of:

determining a second ratio between the second cell count and the second maximum threshold cell count; and determining a third ratio between the third cell count and the third maximum threshold cell count, wherein, the ratio is the highest ratio amongst the ratio, the second ratio and the third ratio, the selecting a scaling factor responsive to the ratio between the cell count and the maximum threshold cell count further comprising using the highest ratio amongst the ratio, the second ratio and the third ratio as a basis for the selecting of the scaling factor.

16. The apparatus of claim 15 wherein one of the queues is a virtual circuit (VC) queue, another of the queues is a class of service (COS) queue and another of the queues is a queue group.

17. A communication device having input and output ports, comprising:

a memory element for storing cells received on input ports;

an arrival controller to determine whether to accept or reject cells, the arrival controller including a circuit that is capable of, detecting a cell that belongs to a first queue, where a cell count and a maximum threshold cell count are associated with the first queue, determining a ratio between the cell count and the maximum threshold cell count, selecting a scaling factor responsive to the ratio between the cell count and the maximum threshold cell count, scaling the cell count by the scaling factor to provide a scaled cell count, comparing the scaled cell count with the maximum threshold cell count, discarding the cell if the scaled cell count is greater than the maximum threshold cell count; and a departure controller to select cells from the memory element for transmitting to the output ports.

18. The communication device of claim 17 wherein the circuit, in order to select the scaling factor, selects the scaling factor from a table containing a plurality of scaling factors.

19. The communication device of claim 18 wherein the circuit further comprises, in order to compare the scaled cell count with the maximum threshold cell count, a comparator having a first input that receives the maximum threshold cell count and a second input that is coupled to an output of a multiplier that performs the scaling, the multiplier having a first input that is coupled to the output of the table and a second input that receives the cell count.

20. A machine readable medium having stored thereon sequences of instructions which, when executed by a processor or controller, perform a method for performing threshold checking in a communication device, the method comprising:

detecting a cell that belongs to a first queue, where a cell count and a maximum threshold cell count are associated with the first queue;

determining a ratio between the cell count and the maximum threshold cell count;

selecting a scaling factor responsive to the ratio between the cell count and the maximum threshold cell count;

scaling the cell count by the scaling factor to provide a scaled cell count; comparing the scaled cell count with the maximum threshold cell count; and discarding the cell if the scaled cell count is greater than the maximum threshold cell count.

21. The machine readable medium of claim 20 wherein the cell is a start of frame cell.

22. The machine readable medium of claim 20 wherein the cell is a start of packet cell.

23. The machine readable medium of claim 20 wherein discarding the cell comprises discarding the cell if the scaled cell count is greater than or equal to the maximum threshold cell count.

24. The machine readable medium of claim 20 wherein a minimum threshold cell count is associated with the first queue, the method further including:

comparing the cell count with the minimum threshold cell count; and performing the determining, the selecting, the scaling, the comparing, and the discarding as a consequence of the cell count being greater than the minimum threshold cell count.

25. The machine readable medium of claim 20, wherein the cell also belongs to a second queue and a third queue, where a second cell count and a second maximum threshold cell count are associated with the second queue, and where a third cell count and a third maximum threshold cell count are associated with the third queue, the method further comprising:

determining a second ratio between the second cell count and the second maximum threshold cell count; and determining a third ratio between the third c ell count and the third maximum threshold cell count, wherein, the ratio is the highest ratio amongst the ratio, the second ratio and the third ratio, the selecting a scaling factor responsive to the ratio between the cell count and the maximum threshold cell count further comprising using the highest ratio amongst the ratio, the second ratio and the third ratio as a basis for the selecting of the scaling factor.

26. The machine readable medium of claim 25 wherein one of the queues is a virtual circuit (VC) queue, another of the queues is a class of service (COS) queue and another of the queues is a queue group.

27. An apparatus for performing threshold checking in a communication device, the apparatus comprising:

means for detecting a cell that belongs to a first queue, where a cell count and a maximum threshold cell count are associated with the first queue;

means for determining a ratio between the cell count and the maximum threshold cell count;

means for selecting a scaling factor responsive to the ratio between the cell count and the maximum threshold cell count;

means for scaling the cell count by the scaling factor to provide a scaled cell count;

means for comparing the scaled cell count with the maximum threshold cell count; and means for discarding the cell if the scaled cell count is greater than the maximum threshold cell count.

28. The apparatus of claim 27 wherein the means for discarding the cell further comprises means for discarding the cell if the scaled cell count is greater than or equal to the maximum threshold cell count.

29. The apparatus of claim 27 wherein a minimum threshold cell count is associated with the first queue, the apparatus further comprising:.

means for comparing the cell count with the minimum threshold cell count; and means for performing the determining, the selecting, the scaling, the comparing, and the discarding as a consequence of the cell count being greater than the minimum threshold cell count.

30. The apparatus of claim 27, wherein the cell also belongs to a second queue and a third queue, where a second cell count and a second maximum threshold cell count are associated with the second queue, and where a third cell count and a third maximum threshold cell count are associated with the third queue, the apparatus further comprising:

means for determining a second ratio between the second cell count and the second maximum threshold cell count; and means for determining a third ratio between the third cell count and the third maximum threshold cell count, wherein, the ratio is the highest ratio amongst the ratio, the second ratio and the third ratio, the means for selecting a scaling factor responsive to the ratio between the cell count and the maximum threshold cell count further comprising means for using the highest ratio amongst the ratio, the second ratio and the third ratio as a basis for the selecting of the scaling factor.

31. The apparatus of claim 30 wherein one of the queues is a virtual circuit (VC) queue, another of the queues is a class of service (COS) queue and another of the queues is a queue group.

* * * * *